March 21, 1944.　　A. H. KIESEL　　2,344,821
POWER SHOVEL
Filed Jan. 28, 1943　　2 Sheets-Sheet 1
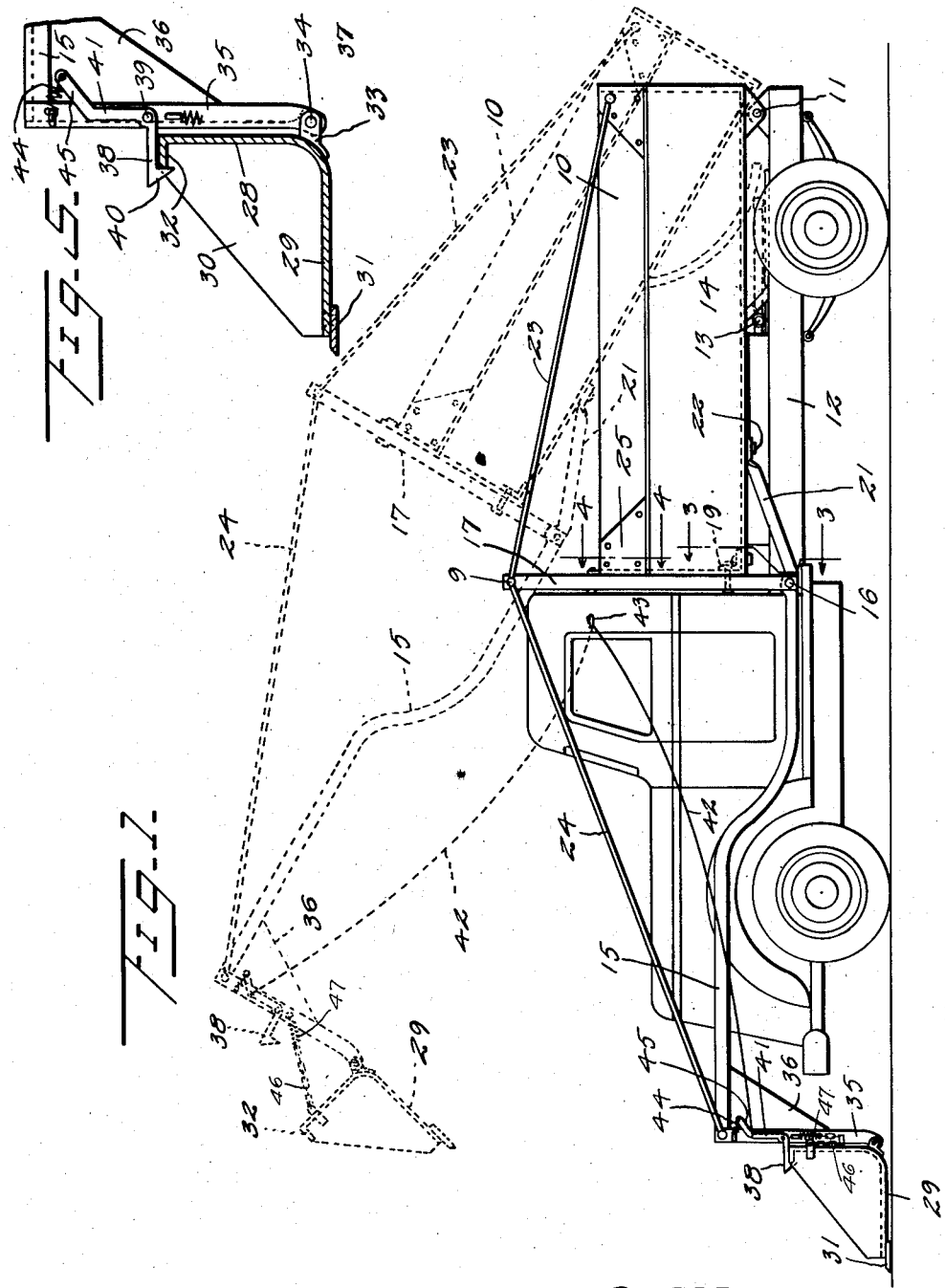
A. H. Kiesel
INVENTOR
BY Victor J. Evans & Co.
ATTORNEYS March 21, 1944.     A. H. KIESEL     2,344,821
POWER SHOVEL
Filed Jan. 28, 1943     2 Sheets-Sheet 2
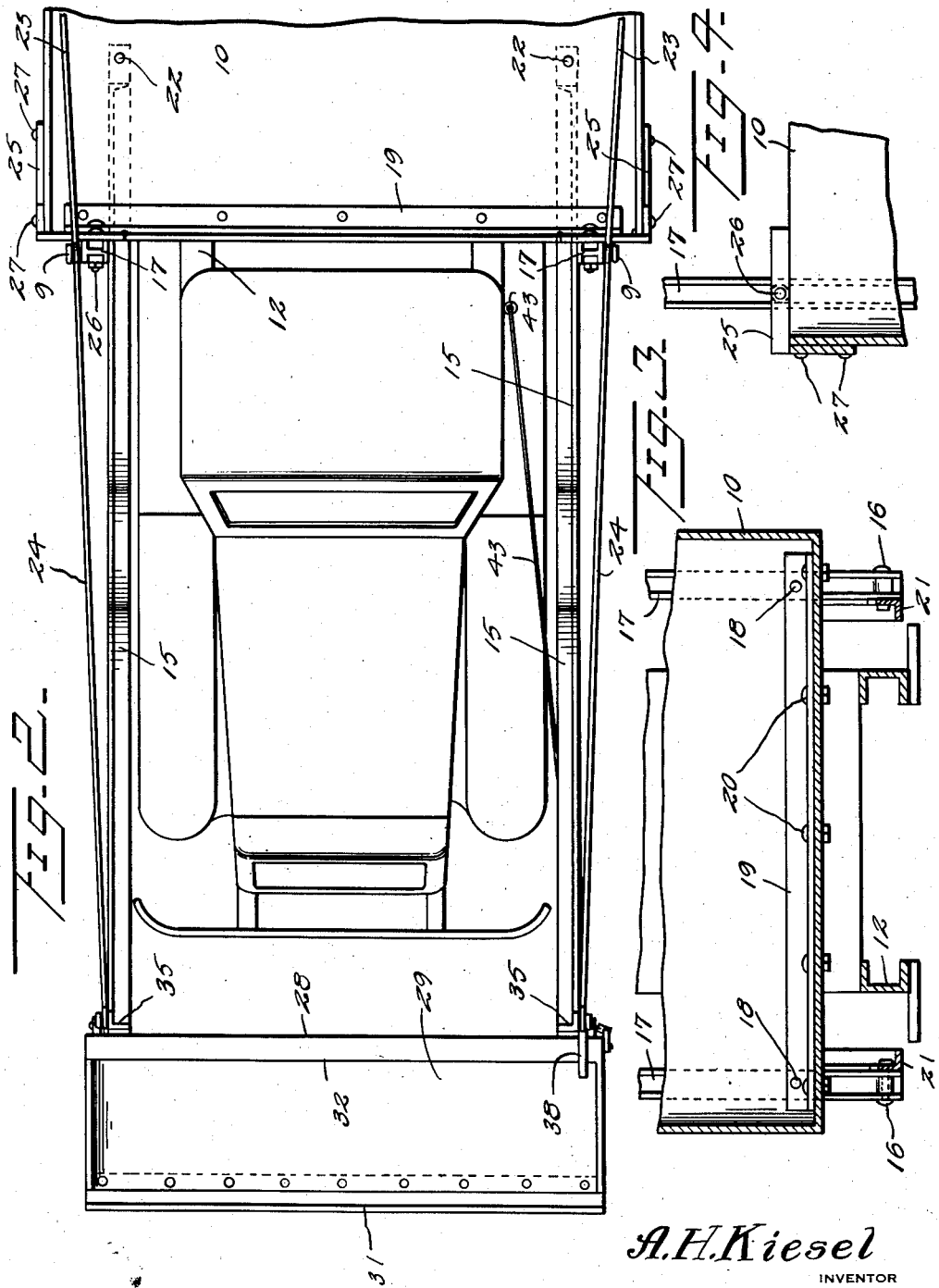
A. H. Kiesel
INVENTOR
BY Victor J. Evans & Co.
ATTORNEYS Patented Mar. 21, 1944

2,344,821

UNITED STATES PATENT OFFICE 2,344,821

POWER SHOVEL

Albert H. Kiesel, Tiffin, Ohio

Application January 28, 1943, Serial No. 473,870

2 Claims. (Cl. 214—140)

This invention relates to a power shovel and has for an object to provide a shovel attachment for a dump truck body pivotally adapted to be raised to dumping position when the truck body is elevated for discharging its contents into a second truck.

A further object is to provide a device of this character including a frame which extends to a point forwardly of the truck body and a scraper bucket pivotally mounted on the frame and adapted to be loaded by driving the truck forward, and adapted to be emptied when the truck body is raised, by release of the bucket latch.

A further object is to provide a device of this character which will be formed of a few strong, simple and durable parts, which will be inexpensive to manufacture, and which will not easily get out of order.

With the above and other objects in view, the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 1 is a side elevation of a power shovel constructed in accordance with the invention applied to a dump truck.

Figure 2 is a plan view of the power shovel and truck shown in Figure 1.

Figure 3 is a cross sectional view of the truck body taken on the line 3—3 of Figure 1.

Figure 4 is a cross sectional view taken on the line 4—4 of Figure 1.

Figure 5 is a longitudinal sectional view of the scraper bucket and its latch.

Referring now to the drawings in which like characters of reference designate similar parts in the various views, 10 designates a conventional dump truck body, the same being pivoted, as shown at 11, to the rear ends of the longitudinal sills 12 of the truck chassis, and being rocked upward on the hinge by a member 13 movable by hydraulic means against an arcuate arm 14 connected to the truck body. These parts are conventional.

In carrying out the invention, a pair of forwardly extending arms 15 are fixedly secured at the rear ends by bolts 16 to the lower ends of uprights 17 in the nature of I-beams which are secured to the front wall of the truck body by bolts 18 passed through angular bars 19, which are bolted, as shown at 20, to the bottom of the truck body 10, see Figure 3. The arms extend rearwardly beyond the uprights, as shown at 21, and are bolted to the bottom of the truck body, as shown at 22. Triangular braces 8 are secured to the lower ends of the uprights by the bolts 16 and abut the bottom of the body 10.

Downwardly inclined adjustable chains or cables 23 and 24 are secured to the upper ends of the uprights by bolts 9, the chains or cables 23 being secured to the truck body 10 and the chains or cables 24 being secured to the front ends of the arms 15. The chains or cables allow the bracket to rise if a high obstacle is struck. The uprights are secured near the upper ends thereof to the front wall to the truck body by angular brackets 25 which are bolted to the uprights, as shown at 26, see Figure 1, and are bolted to the sides of the truck body, as shown at 27.

From the above it is clear, that the forwardly extending arms 15 are rigidly secured to the truck body and move as a unit with the truck body when the truck body is tilted up at the forward end, as shown in dotted lines, in Figure 1.

The bucket includes a rear wall 28, see Figure 5, a bottom wall 29, and triangular side walls 30. A scraper blade 31 is secured to the leading edge of the bottom wall, and a flange 32 projects forwardly from the top edge of the rear wall.

The bucket is provided at the bottom of the rear wall with hinge eyes 33 to receive pintles 34. Arms 35 are rigidly secured at the upper ends, in any preferred manner, to the forward ends of the arms 15 and extend downward perpendicular to the arms 15. Triangular braces 36 are disposed in the angle between the arms 35 and 15 to reinforce the arms 35 against dislodgment when the bucket is being loaded by forward movement of the truck. The lower ends of the arms 35 are equipped with hinge eyes 37 which receive the pintles 34 to pivotally mount the bucket on the arms 35.

A latch 38 is pivotally secured to one of the arms by a pivot pin 39 passed through the arm and is provided with a tooth 40 which hooks over the edge of the flange 32 to hold the bucket in loading position. The latch is in the nature of a bell crank having an upwardly extending arm 41 to which a cable 42 is connected. The cable is fastened at the rear end to an eye 43 to the truck near the driver's position. When the cable is pulled after the truck body has been raised to raise the bucket over another truck to be loaded, the latch 38 will be released to permit the bucket to rock downward and discharge its contents into the empty truck.

For returning the latch to operative position, a helical spring 44 is connected at one end to the arm 15 and at the other end to an extension 45 on the arm 41 of the latch. The spring normally holds the latch in operative engagement with the flange 32 of the bucket.

A compensating chain 46, with a spring 47 forming a part thereof, is secured to the bucket and to one of the arms 35. The compensating chain prevents the bucket from rotating past a predetermined discharge position on the arms 35.

Since the operation of the parts has been described as the description of the parts progressed, it is thought the invention will be fully understood without further explanation.

What is claimed is:

1. The combination with the tiltable body of a dump truck, of a pair of uprights secured to the forward part of the body and extending thereabove, a pair of arms connected at their rear ends to the body and extending forwardly therefrom, a scraper bucket tiltably mounted on the forward ends of the arms, a manually releasable latch means releasably holding the bucket in loading position, and members secured to the upper ends of the uprights and to the front ends of the arms, said members supporting the forward ends of the arms and being flexible to permit the bucket to rise on striking a relatively high obstacle.

2. The combination with a truck having a cab equipped with side doors and a tiltable body rearwardly of the cab, of a support element secured to and depending from the front of the body at each side, an arm connected to the lower end of each support element and extending forwardly therefrom, said arms having portions which assume positions at the respective sides of the cab and below the doors thereof when the body is in lowered position to enable opening of said doors, and a scraper bucket carried by the front ends of the arms forwardly of the truck.

ALBERT H. KIESEL.